(12) United States Patent
Sørensen et al.

(10) Patent No.: US 10,494,193 B2
(45) Date of Patent: Dec. 3, 2019

(54) SORTING MECHANISM WITH DYNAMIC DISCHARGE

(71) Applicant: BEUMER Group A/S, Aarhus N (DK)

(72) Inventors: Brian Lynge Sørensen, Risskov (DK); Jan Christensen, Odder (DK)

(73) Assignee: Beumer Group A/S, Aarhus (DK)

( * ) Notice: Subject to any disclaimer, the term of this patent is extended or adjusted under 35 U.S.C. 154(b) by 0 days.

(21) Appl. No.: 15/837,307

(22) Filed: Dec. 11, 2017

(65) Prior Publication Data

US 2018/0099818 A1 Apr. 12, 2018

Related U.S. Application Data

(63) Continuation of application No. 14/357,999, filed as application No. PCT/DK2011/050442 on Nov. 21, 2011, now Pat. No. 9,878,852.

(51) Int. Cl.
*B65G 43/08* (2006.01)
*B65G 47/94* (2006.01)

(52) U.S. Cl.
CPC .......... *B65G 43/08* (2013.01); *B65G 47/945* (2013.01); *B65G 2201/0264* (2013.01)

(58) Field of Classification Search
USPC ...................................................... 700/218
See application file for complete search history.

(56) References Cited

U.S. PATENT DOCUMENTS 3,662,906 A * 5/1972 Christensen ............ B61B 1/005
104/172.2
4,249,661 A 2/1981 Lem
(Continued)

FOREIGN PATENT DOCUMENTS

DE 1 263 600 3/1968
DE 42 20 117 A1 2/1993
(Continued)

OTHER PUBLICATIONS

International Search Report and Written Opinion received in related PCT/DK2011/050442 dated Aug. 1, 2012.
(Continued)

*Primary Examiner* — Kyle O Logan
(74) *Attorney, Agent, or Firm* — Woodard Emhardt Henry Reeves & Wagner, LLP

(57) ABSTRACT

The invention provides a high speed sorting mechanism arranged to empty or discharge a container for carrying a load, e.g. totes in a luggage handling system. The sorting mechanism as a plurality of tilting elements T1-T11 for receiving and transporting the container in a transport direction. The tilting elements T1-T11 are arranged neighbouring each other, and they are individually tiltable by controllable tilting actuators, e.g. servo motors. Hereby, the tilting elements T1-T11 can tilt around an axis parallel with the transport direction. A computerized controller serves to individually control the tilting of the tilting elements T1-T11 with a control algorithm in response to at least one position signal such that a group of at least two tilting elements T1-T11 perform a coordinated tilting motion in response to the position signal so as to tilt the container for emptying or discharging its load, upon the container passing the sorting mechanism in the transport direction. A row of such as 10-20 identical tilting elements T1-T11 each with a length of such as 30-50% of the container or tote to be handled. The tilting elements T1-T11 are preferably stationary seen in the transport direction, and the container or tote is driven forward by friction drive means FB on each of the tilting elements T1-T11. Preferably, position sensors on or at each tilting element T1-T11 serve to provide input to the controller regarding position of the container or tote, thus enabling the control algorithm to generate control signals to control a tilting angle of each of the tilting elements T1-T11 accord- (Continued)

ingly to provide a forward propagating wave serving to smoothly support the container in a gradual combined tilting and forward motion.

37 Claims, 6 Drawing Sheets

(56) References Cited

U.S. PATENT DOCUMENTS

| | | | |
|---|---|---|---|
| 5,024,316 A | | 6/1991 | Scata et al. |
| 5,301,790 A | | 4/1994 | Prydtz et al. |
| 5,474,415 A | | 12/1995 | Becker et al. |
| 5,676,514 A | * | 10/1997 | Higman ................. B61B 13/04 198/349 |
| 6,231,293 B1 | | 5/2001 | van Woensel |
| 6,607,066 B1 | * | 8/2003 | Andersen ............. B65G 17/345 198/370.04 |
| 6,827,198 B1 | | 12/2004 | Costanzo |
| 6,860,377 B2 | | 3/2005 | Brixius et al. |
| 6,874,614 B2 | | 4/2005 | Heitplatz |
| 2002/0179502 A1 | * | 12/2002 | Cerutti ...................... B07C 3/02 209/583 |
| 2004/0069593 A1 | * | 4/2004 | Heitplatz ............. B65G 47/962 198/370.04 |
| 2004/0134752 A1 | * | 7/2004 | Miller ................. B65G 17/345 198/370.06 |
| 2004/0200693 A1 | * | 10/2004 | Brixius ................. B65G 35/06 198/349 |
| 2007/0129843 A1 | * | 6/2007 | Lupton ..................... B07C 5/36 700/223 |

FOREIGN PATENT DOCUMENTS

| | | |
|---|---|---|
| DE | 100 44 612 A1 | 3/2002 |
| EP | 0 269 495 A2 | 6/1988 |
| EP | 0 351 778 A2 | 1/1990 |
| EP | 0 456 297 B1 | 4/1994 |
| EP | 0 581 398 B1 | 10/1996 |
| EP | 1 103 499 A1 | 5/2001 |
| EP | 1 120 369 B1 | 4/2004 |
| EP | 1 411 008 A1 | 4/2004 |
| EP | 1 388 510 B1 | 10/2005 |
| EP | 1 362 804 B1 | 2/2006 |
| EP | 1 719 721 A1 | 11/2006 |
| EP | 2 105 394 A1 | 9/2009 |
| FR | 2 327 168 A1 | 5/1977 |
| JP | H02-193811 | 7/1990 |
| JP | H07-179225 A | 7/1995 |
| JP | H09-226936 A | 9/1997 |
| WO | WO 2011/139147 A1 | 11/2011 |

OTHER PUBLICATIONS

Machine translation of DE10044612A1 by Lexis Nexis Total Patent on Dec. 26, 2017.
Machine translation of DE1263600 by Lexis-Nexis Total Patent on Dec. 6, 2017.
Machine translation of EP110499A1 by European Patent Office Patent Translate on Dec. 21, 2017.
Machine translation of FR2327168A1 by Lexis Nexis Total Patent on Dec. 26, 2017.
Machine translation of JP07179225A by Lexis Nexis Total Patent on Dec. 26, 2017.
Machine translation of JP09226936A by LexisNexis Total Patent on Dec. 26, 2017.

* cited by examiner

SORTING MECHANISM WITH DYNAMIC DISCHARGE

CROSS-REFERENCE TO RELATED APPLICATIONS

This application is a continuation of U.S. patent application Ser. No. 14/357,999 filed May 13, 2014, which is the U.S. national stage application of International Patent Application No. PCT/DK2011/050442, filed Nov. 21, 2011, which are both hereby incorporated by reference.

FIELD OF THE INVENTION

The invention relates to the field of handling and sorting of materials or loads, such as baggage or parcels or the like. In particular, the invention provides a sorting mechanism and a method for emptying of loads from a container or tote by a dynamic discharge.

BACKGROUND OF THE INVENTION

A material handling system is a system in which materials are handled by transporting them in accordance with a determined destination and which may comprise sorting such materials in accordance with such destinations. It is to be understood that the materials handled in the examples herein are items such as postal parcels or airport baggage and similar goods of various sizes and shapes.

In some systems, the materials can be moved on containers or totes. Such totes can be moved by a driven belt or a roller in various types of material handling systems. There are numerous types of sites where such material handling systems are used, and particular examples are postal package hubs, mail order distribution centres and airports.

A high capacity is required in such handling and sorting systems, e.g. in airports where all luggage from a just landed aircraft should be handled fast in order to provide a high service level to the airline companies and to the travelers. Thus, a maximum capacity of a handling and sorting system is important.

Sometimes, the sorting mechanisms of such systems is a bottle neck with respect to maximum throughput of containers or totes per time unit. Especially, in many existing systems, the container or tote is stopped in its forward motion when arriving at the sorting mechanism. The sorting mechanism is serving to tilt the container or tote for emptying its load, i.e. to discharge the load, at its target destination. This means that the process of emptying the container or tote limits the maximum capacity of the entire handling and sorting system.

SUMMARY OF THE INVENTION

Thus, according to the above description, it may be seen as an object of the present invention to provide a sorting mechanism for containers or totes which has an improved capacity.

Further, it may be seen as an object to provide a sorting mechanism which is flexible with respect to accepting containers or totes of different lengths.

Still further, it may be seen an object to provide a sorting mechanism which is flexible with respect to configuration of discharge position without requiring a stop of operation of the sorting mechanism or re-building a physical configuration thereof or of another part of the system.

Even further, it may be seen as an object to provide a sorting mechanism which is easy to repair and maintain so as to minimize down-time in case of failures.

Preferably, the invention alleviates, mitigates or eliminates one or more of the above or other disadvantages singly or in any combination.

In a first aspect, the invention provides a sorting mechanism arranged to empty a container for carrying a load, the sorting mechanism comprising a plurality of tilting elements arranged to receive and transport the container in a transport direction, the plurality of tilting elements being arranged neighbouring each other, individually tiltable by means of individually controllable tilting actuators arranged to tilt the tilting elements around a tilting axis parallel or substantially parallel with the transport direction, and a computerized controller arranged to control the individually controllable tilting actuators in accordance with a control algorithm in response to at least one position signal, wherein the control algorithm is arranged to control the tilting actuators of a group of at least two tilting elements so as to cause the group of at least two tilting elements to perform a coordinated tilting motion in response to the at least one position signal so as to tilt the container for emptying its load, upon the container passing the sorting mechanism in the transport direction.

The sorting mechanism is advantageous for a number of reasons. With a coordinated tilting motion of tilting elements that are stationary in the transport direction, it is possible to gradually tilt the container during its passage on the tilting elements to the point where the load is emptied, also called discharged. By a proper control of the tilting angle of each individual tilting element, emptying of the container can be performed at high moving speed of the container or tote without the need to stop the container or tote in its forward motion in the transport direction. For example, this allows emptying totes for luggage transport at a high capacity, e.g. allowing a capacity of at least 1000 totes per hour, but even capacities of 2000-4000 totes per hour can be obtained, among others in dependence of the length of the tote.

Further, the sorting mechanism is flexible with respect to accepting containers or totes of different lengths. Especially, it may be preferred that the length of the tilting elements is shorter than, seen in the transport direction, the length of the containers or totes to be handled. In such case, it is a matter of design of the control algorithm to allow the sorting mechanism to handle different container lengths.

It is even possible to accept two successively arriving containers with different lengths, since it is possible to design the control algorithm to have an input indicative of the length of an arriving container. Hereby, the control algorithm may calculate a suitable number of tilting elements to be included in the mentioned group of neighbouring tilting elements, and thus the coordinated tilting movement of the tilting elements in response to the at least one position signal can be changed dynamically from one arriving container to the next arriving container.

With suitable selection of position signal inputs to the computerized controller and thus the control algorithm, e.g. in response to a signal from at least one position sensor for each tilting element to sense the presence of a container, the length of an arriving container can be determined by the control algorithm when the full length of the container has arrived at the tilting elements. In this way, the sorting mechanism can automatically adapt the coordinated tilting motion of the tilting element to best match a required tilting waveform for effective tilting for emptying of an arriving container with a given length. Other ways of inputting the length of an arriving container may also be used as input to the control algorithm, e.g. bar codes on the container, one or more vision cameras, or the like.

Still further, the sorting mechanism is flexible with respect to configuration of discharge position without requiring a stop of operation of the sorting mechanism or re-building another physical configuration. The design with a plurality of tilting elements controlled by a computerized controller allows easy and flexible adjustment to different needs. E.g. the tilting elements may be configured for tilting to both sides, thus allowing emptying of an arriving container in two opposite directions transverse to the transport direction, if desired. This can be determined by the control algorithm, and/or by a control system external to the sorting mechanism, e.g. an overall control of a transport system or handling system.

Further, if a long row of neighbouring tilting elements are used, say forming a row of tilting elements which is such as 10 times the length of a container, the actual emptying or discharge position can be determined by the control algorithm. Thus, a plurality of emptying or discharge positions can be determined in software using one single sorting mechanism configuration, i.e. without the need to physically re-build the sorting mechanism.

Also, an existing sorting mechanism according to the first aspect is easy to extend in length, e.g. to implement more discharge positions, since this merely requires extending the existing sorting mechanism with more tilting elements, connecting them to the computerized controller, and updating the control algorithm to the new configuration. However, compared to other solutions, the existing tilting elements can be used, and the computerized controller may be prepared for connection of more tilting elements.

Even further, the sorting mechanism can be implemented in versions which are easy to repair and maintain so as to minimize down-time in case of failures of parts of the sorting mechanism. Especially, it may be preferred that all tilting elements are implemented as identical tilting element units, i.e. only one type of tilting element unit is required and can thus be mass produced. With only one single type of tilting element unit, spare units can easily be stored for easy insertion in case one unit fails after several years of wear and tear.

In preferred embodiments, the sorting mechanism may be arranged to either let a container pass without emptying, i.e. acting merely as a conveyor track for the container, e.g. in response to an input signal to the control algorithm. Such input signal can be generated in response to an output from a bar code reader reading a bar code on the container or on its load and thus determining if the container should be tilted for emptying or not. Further, as already mentioned, in some embodiments, the sorting mechanism may be arranged for emptying or discharging containers at one or more positions, e.g. including opposite directions transverse to the transport direction, and the sorting mechanism is in such case preferably arranged to determine if an arriving container should be emptied, and if so, at which of the one or more emptying or discharging positions. In this way, the sorting mechanism can advantagesouly form part of a load handling system, such as a luggage handling system in an airport.

In preferred embodiments, the mentioned coordinated tilting movement is controlled such that the container is supported by the row of tilting elements upon its passage on the tilting elements. To obtain this, the control algorithm may be arranged to control tilting angles of the plurality of tilting elements so as to change tilting angle of one, two or three tilting elements at a time in a wave of tilting elements in the transport direction, especially tilting neighbouring tilting elements in the transport direction. The control algorithm may be arranged to control individual tilting angles of the tilting actuators of the plurality of tilting elements, such that the tilting elements cooperate to support the container during its passage of the plurality of tilting elements.

Arriving to the first tilting element of the sorting mechanism with a neutral tilting angle, e.g. horizontal position, the individual tilting angles of the tilting elements are then adjusted in a coordinated manner over time by the computerized controller. This control is preferably such that the container is supported by the tilting elements during its passage thereon such that the container performs a desired combined gradual sideward tilting and forward motion up to the point where its load is discharged. In other words, the sorting mechanism can generate a desired forward moving wave form by individually controlling tilting angles of the individual tilting elements in a coordinated manner linked to the position signal such that the tilting angles are coordinated with the position of the container.

In some embodiments, the control algorithm is arranged to increase a tilting angle of the group of at least two tilting elements during the container passing the at least two tilting elements. Hereby, the container can be gradually tilted when it is present and supported by the group of tilting elements, especially if the group of tilting elements are neighbouring tilting elements. More specifically, the control algorithm may be arranged to control tilting angles of each of the tilting elements of the group of at least two tilting elements such that they perform identical or substantially identical tilting movements simultaneously. Even more specifically, the control algorithm may be arranged to control the group of at least two tilting elements such that they simultaneously have one common tilting angle, and wherein the common tilting angle is gradually increased over time.

In some embodiments, the common tilting angle is gradually increased to a tilting angle serving to empty the container. In this way a group of two or more tilting elements cooperate to support the container. Especially, if the length of the container corresponds to the total length of a group of two, three or four tilting elements, it can be ensured that the container is supported such that it does not perform an unwanted and uncontrolled tilt forward or backward in the transport direction which may cause the load to be discharged in an uncontrolled manner.

Especially, the control algorithm may be arranged to adjust a number of tilting elements included in the group of at least two tilting elements in response to a dimension, especially a length, of the container to be handled. Hereby the number of tilting elements, especially neighbouring tilting elements, forming the group may be dynamically selected by the control algorithm such that the total length of the group of tilting elements suits the length of the container actually handled such that the container is supported in its entire length by the group.

Further, the control algorithm may be arranged to adjust a number of tilting elements included in the group of at least two tilting elements in response to a speed of the container to be handled, thus including more tilting elements in the group at higher speeds in the transport direction, and fewer tilting elements in the group at lower speeds. At higher speeds, it may be preferred that the total length of the group of tilting elements exceeds the length of the container handled, such as exceeding the container length by at least one, two or more tilting elements.

To provide an improved capacity compared to other solutions, the tilting angle of a tilting element is preferably decreased upon the container leaving the tilting element, thereby allowing a tilting element to tilt back towards a neutral position in order to quickly prepare for receipt of the next container as soon as one container has left the tilting element. Especially, a tilting angle of at least one tilting element is decreased to a pre-determined non-horizontal tilting angle, e.g. a tilting angle of 5°-15°, such as 7°, so as to prepare for receipt of a successive container. Especially, this pre-determined tilting angle may be the target angle for the tilting element in case the control algorithm has determined that the next container is also to be emptied, whereas it may be preferred to select horizontal position, i.e. 0° tilting angle, as a target angle, in case the control algorithm has determined that the next container is to pass the sorting mechanism without emptying.

The individually controllable actuactor of at least one of the plurality of tilting elements is preferably arranged for being controlled to at least two different tilting angles, i.e. 1) a horizontal or neutral tilting angle, 2) a tilting angle sufficient to empty the container. More preferably, at least some of the tilting elements are arranged for being controlled to at least three different tilting angles, i.e. at least 1) a horizontal or neutral tilting angle, 2) a tilting angle sufficient to empty the container, and 3) an intermediate tilting angle between 1) and 2). Especially, it is preferred that any one of the plurality of tilting elements can be controlled to tilt to a given tilting angle at any moment according to the control algorithm. However, more preferably, the tilting elements can be controlled to obtain more different tilting angles, e.g. in steps, such as 5 or 10 steps, or even more steps. Hereby, a more precise waveform can be generated, and thus the support of the container during its passage of the sorting mechanism can be controlled to more closely match a desired combined tilting and forward motion and thus allow tilting the container for emptying while passing in the transport direction at high speed, and while having full control of the support and tilt of the container.

The at least one position signal may be generated in response to a position sensor arranged to sense a position of the container. This allows the control algorithm to temporally coordinate the control of tilting angle of the tilting elements with passage of the container in order to provide the most effective tilting motion to support the container during emptying.

In preferred embodiments, the position sensor is arranged on or near at least one tilting element to sense a position of the container relative to the at least one tilting element. This allows the control algorithm to determine a position of the container relative to at least one tilting element, and thus control the tilting elements accordingly to ensure that the tilting pattern of the tilting elements serve to provide the desired tilting motion of the container. More preferably, a plurality of position sensors are placed on or near respective tilting elements to sense a position of the container relative to the respective tilting elements, and wherein a plurality of respective position signals are generated in response to said plurality of position sensors.

Especially, one position sensor can be placed on or near all of the tilting elements, so as to allow position detection with a spatial resolution corresponding to the length of one tilting element. In still further embodiments, at least two position sensors may be placed on or near at least one tilting element at different locations relative to the at least one tilting element, so as to sense a container arrival to the at least one tilting element and container departure from the at least one tilting element, respectively. Hereby, an even more close match of the tilting of each tilting element can be controlled by the control algorithm to ensure an effective handling of the container.

Preferably, the position signal is indicative of a position of the container relative to at least one of the plurality of tilting elements, and as mentioned, most preferably, position sensors are arranged to sense if the container is present at each tilting element. This allows a tilting element to return to a next tilting angle as soon as the container leaves the tilting element, thus preparing quickly to receive the next container.

Alternatively or additionally, a position signal indicative of a position of the container can be determined using a vision camera based solution, where a camera captures images so as to monitor and determine the position of each container in the sorting mechanism.

In that full control and/or support of each container can be provided by the present solution, a position of the container may alternatively or additionally be based on the moving speed of the container in the sorting mechanism and/or prior to the sorting mechanism, and a single position signal given at a certain moment, e.g. when the container enters the sorting mechanism.

The tilting actuators are preferably arranged to provide a plurality of tilting angles correlated to an electric input signal, and wherein the tilting actuators can be such as: a stepping motor, a servo motor, or a pneumatically driven actuator. The actuator may either actuate the tilting element directly or via a rod, a belt, a chain, a gear box or the like. Especially, the tilting actuators may be arranged to tilt the tilting elements to both sides of a neutral position, so as to allow tilting of the container in one of two opposite directions transversely to the transport direction.

More specifically, the control algorithm may be arranged to tilt a first container to empty its load to one direction transversely to the transport direction and to tilt a successive second container to empty its load to the opposite direction transversely to the transport direction. Hereby, the one version of the sorting mechanism can be produced and used for discharging to both sides, depending on the control algorithm, i.e. the discharge direction can be determined in software without the need for any physical change in the tilting element setup.

As already mentioned, preferably a length of at least one of the tilting elements, seen in the transport direction, is smaller than a length of the container to be handled. Alternatively, a length of each of at least two of the tilting elements, seen in the transport direction, is smaller than a length of the container. More preferably, the length of each of the plurality of tilting elements is smaller than the container length. More specifically, it may be preferred that the length of each of the plurality of tilting elements is smaller than 50% of the container length, such as smaller than 40%, such as smaller than 30% of the container length. By a width of a tilting element is understood it extensions perpendicular to its extension in the transport direction. In preferred embodiments, the width of each of at least two of the tilting elements is larger than its length. More preferably, the width is at least 150% of the length, such as at least 200% of the length. Preferably, the width of each of the tilting elements is matched with a width of the container to be handled.

Preferably, the plurality of tilting elements comprise friction drive elements arranged to drive the container in the transport direction, such as friction rollers, friction belts, friction wheels etc. Thus, arriving at the tilting elements, the container is driven forward such that its speed in the transport direction can be maintained at a high level. Preferably, all of the tilting elements comprise friction drive elements. The friction drive elements preferably serve to support the container, and thus the individual friction drive elements are structurally linked to the individual tilting element and thus follows the same tilt as the tilting element.

Preferably, e.g. in order to provide sideward support of the container, the friction drive elements comprise a set of at least two drive elements spatially arranged to support the container on each side transversely to the transport direction. The friction drive elements may be driven by individual driving means for each of the plurality of tilting elements, thereby ensuring that the tilting elements can tilt independently of each other without any drive means that structurally link the tilting elements. Further, if preferred, it may hereby be possible to control the speed which the friction drive elements are adapted to give the container independently for the tilting elements. Hereby, it is even possible to increase or decrease a speed of the container in the sorting mechanism. E.g. this may be used to be able to change a distance between two successive containers in the sorting mechanism, by the sorting mechanism and by controlling their speeds individually.

The plurality of tilting elements preferably have guides at least on one side, seen in the transport direction, so as to support the container sidewise, e.g. in the form of wheels or rollers. Such guides help to guide the container along the tilting elements, and during tilting for emptying, the guide preferably serves to prevent the container from falling off the sorting mechanism and still without significant friction that would slow down the forward motion of the container. Thus, preferably the guides are in contact with the container only by wheels, rollers and the like. Most preferably, the tilting elements have guides on both sides, at least this is preferred if the tilting elements are arranged to tilt to both sides.

The control algorithm may be arranged to control the plurality of tilting elements so as to handle simultaneous passage of at least two containers at different positions along the plurality of tilting elements. Thus, in some embodiments one row of tilting elements can be used for simultaneously handling two or more containers, especially a first container may be tilted for emptying while a second container following the first container may be in a slightly tilted position preparing for tilting for emptying at the same discharge position as the first container, or at another position. Alternatively or additionally, one of two containers moving simultaneously in the sorting mechanism can be tilted for emptying while the other container is not. More alternatively, two containers can be tilted simultaneously, such as two containers being tilted for emptying simultaneously.

The sorting mechanism may comprise two tilting elements. More preferably, it comprises at least three elements, more preferably it comprises at least four tilting elements. However, to be able to most effectively handle gradual tilting of a container for emptying at high speed, a higher number of tilting elements may be used. Such as 5-10, or 10-20, or even more than 20 tilting elements. As mentioned, one sorting mechanism can be used to provide several discharge positions, and possibly also handle two or more containers simultaneously, and such embodiments may comprise such as 20-40 tilting elements or even more.

In preferred embodiments, the tilting element forms part of a tilting element unit comprising a stationary part arranged for standing on or fixed to the ground or on a floor. The tilting element is tiltably mounted on the stationary part, and the tilting actuator is connected to both the tilting element and the stationary part so as to tilt the tilting element relative to the stationary part. Thus, the tilting element preferably has a fixed position, seen in the transport direction.

In preferred embodiments, the sorting mechanism is arranged to empty containers at a capacity of at least 1000 containers per hour, such as at least 2000, such as at least 3000 containers per hour, hereby allowing applications within high speed luggage sorting in luggage handling systems in airports.

It may be preferred that the group of at least two tilting elements mentioned above is a group of at least two neighbouring tilting elements, or preferably a group of at least three neighbouring tilting elements. This provides an efficient handling of containers with a high capacity since a very precise coordinated tilting motion can be obtained.

However, in alternative embodiments, only some of the plurality of tilting elements constituting the sorting mechanism are controlled by the computerized controller, while other ones of the tilting elements are not. Especially, in some embodiments even though a group of two, or more, tilting elements are controlled by the computerized controller, two tilting elements being controlled by the computerized controller may not be neighbouring tilting elements, since it may be preferred to arrange simple tilting elements which are not controlled by the computerized controller between the controlled tilting elements. Such tilting elements which are not controlled by the computerized controller may be arranged to tilt in an individual pattern, e.g. tilting elements capable of switching between two different tilting angles in a preprogrammed pattern or in response to a sensor input or the like. Even though such intermediate tilting elements not being part of the coordinated tilting control may not provide an optimal motion of the container during tilting, it may suffice to obtain an acceptable container tilting pattern for some applications.

In a second aspect, the invention provides a sorting system for sorting load carried on containers, such as totes, the sorting system comprising
  at least one sorting mechanism according to the first aspect, and
  at least one conveyor track arranged to transport the container to the at least one sorting mechanism.

It is to be understood that the sorting mechanism may be combined with different types of conveyor tracks, such as friction drive types of tracks or conveyor belts. As mentioned, the sorting mechanism is capable of handling high capacity emptying or discharging of containers, and thus the sorting system is advantageous for such systems as luggage handling systems capable of handling at least 1000 containers or totes per hour, more preferably at least 2000, more preferably at least 3000 containers or totes per hour.

In preferred embodiments, the sorting system comprises a controller arranged to control the at least one conveyor track arranged to transport the container to the at least one sorting system, so as to control a flow of containers arriving to the sorting mechanism. Especially, the flow of containers arriving to the sorting mechanism may be controlled such that containers arrive to the sorting mechanism at regular or substantially regular intervals. This provides a high capacity in the sorting mechanism.

In a third aspect, the invention provides a method for emptying a container carrying a load in a sorting mechanism, the method comprising receiving the container at a plurality of individually tiltable tilting elements neighbouring each other and being arranged to transport the container in a transport direction, wherein the tilting elements are tiltable around a tilting axis parallel or substantially parallel with the transport direction, and controlling, by means of a computerized control algorithm, tilting of a group of at least two tilting elements to perform a coordinated tilting motion in response to the at least one position signal so as to tilt the container for emptying its load, upon the container passing the sorting mechanism in the transport direction.

The method is advantageous for high speed emptying or discharging of containers or totes, such as for use within high speed luggage handling.

In some embodiments, the method comprises increasing a tilting angle of the group of at least two tilting elements during the container passing the at least two tilting elements. The method may comprise controlling tilting angles of each of the tilting elements of the group of at least two tilting elements such that they perform identical or substantially identical tilting motions simultaneously.

More specifically, the method may comprise controlling the group of at least two tilting elements such that they simultaneously have one common tilting angle, and gradually increasing the common tilting angle over time. Especially, the method may comprise gradually increasing the common tilting angle, possibly of a forward moving group of tilting elements, to a tilting angle serving to empty the container. More specifically, the method may comprise decreasing a tilting angle of a tilting element upon the container leaving the tilting element. More specifically, the method may comprise decreasing a tilting angle of at least one tilting element to horizontal position, i.e. 0° tilting angle, especially this may be preferred for the first and last tilting element of the sorting mechanism, seen in the transport direction. However, it may be preferred to decrease a tilting angle of at least one tilting element to a pre-determined non-horizontal tilting angle so as to prepare for receipt of a successive container, such as a tilting angle of 5°-10°, such as 7°, especially this may be preferred for the second tilting element of the sorting mechanism, seen in the transport direction.

The method preferably comprises controlling the plurality of individually tiltable tilting elements to at least two, more preferably at least three different tilting angles, such as at least 5 or 10 different tilting angles.

The method preferably comprises sensing a position of the container, and generating the at least one position signal in response thereto. More preferably, the position of the container is sensed at regular intervals or continuously so as to track the position of the container during its passage of the sorting mechanism.

The method preferably comprises controlling a flow of containers arriving to the sorting mechanism in order to ensure that the containers arrive to the sorting mechanism at regular or substantially regular intervals. Hereby, it is possible to provide the highest possible capacity of the sorting mechanism. Especially, to obtain a capacity of 3000 totes per hour, it is preferred that the feeding of totes to the sorting mechanism is controlled such that a tote arrives every 1.1-1.3 seconds, preferably every 1.2 seconds.

It is preferred that the mentioned group of at least two tilting elements is a group of at least two neighbouring tilting elements.

It is appreciated that the same advantages and embodiments described for the first aspect apply as well for the second and third aspects. Further, it is appreciated that the described embodiments can be intermixed in any way between the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF EMBODIMENTS

Figure 1:
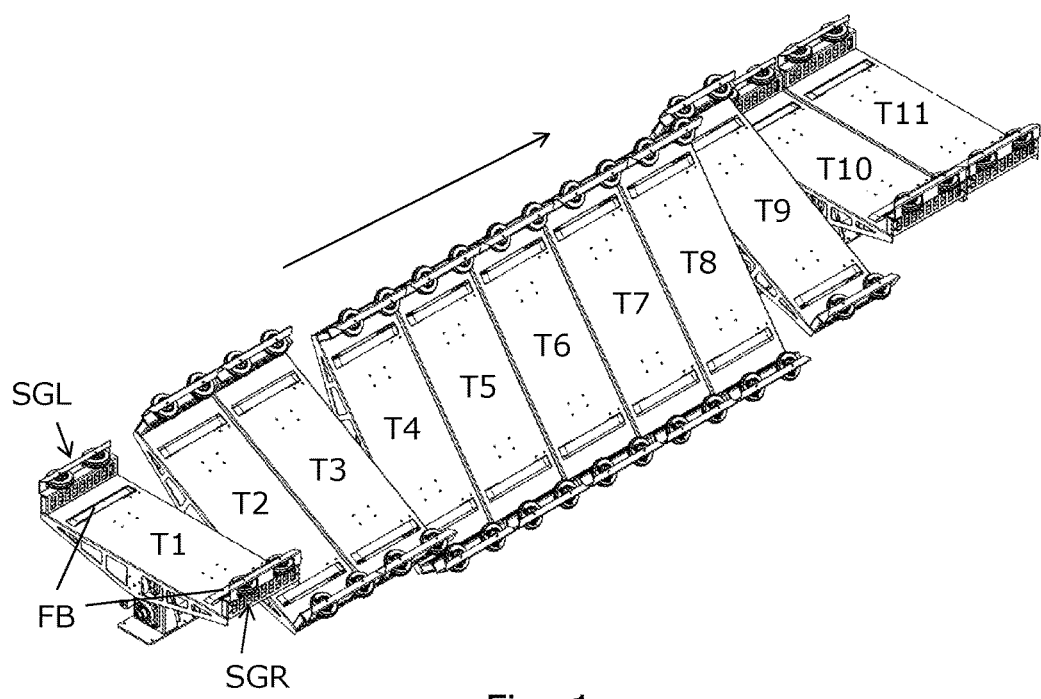
FIG. 1 illustrates one embodiment with 11 tilting elements, some of them being tilted at different tilting angles.

FIG. 1 illustrates a 3D view of a sorting mechanism embodiment with 11 tilting elements T1-T11 arranged to transport and tilt containers or especially totes for emptying their load, e.g. pieces of luggage. The arrow indicates the transport direction of a container or tote, i.e. tilting element T1 receives a tote arriving at the sorting mechanism. In the illustrated situation, the tilting elements T1-T11 have various tilting angles. The tilting elements T1-T11 are identical, and as seen they are arranged aligned on a row neighbouring each other with only a minimum of space between two neighbouring tilting elements. In the embodiment shown, the width of one tilting element T1-T11 is 1150 mm, and the length, seen in the transport direction, is 430 mm. Such size of tilting elements is advantageous for totes having lengths of 1100 mm to 1700 mm. It may be preferred that the tote has a length of at least 1.5 times the length of the tilting element, more preferably at least 2 times the length of the tilting element, so a to provide the most efficient tilting function suitable for high speeds.

In the illustrated embodiments, all of the identical tilting elements T1-T11 are controlled individually with respect to their tilting angle by a computerized controller (not shown) by means of electrical signals communicated to respective servo motor driven actuators of the tilting elements T1-T11.

In general, the embodiments of the sorting mechanism and method according to the invention is able to handle totes with different lengths at the same time, and even then providing a fully controlled and similar or identical tilt of such different totes.

Each of the tilting elements T1-T11 has a substantially planar upward facing surface with protruding friction drive means in the form of friction belts FB, one on each side. The friction belts FB serve to support the tote and to drive the tote in the transport direction, since the friction belts are driven by an electric motor mounted on the tilting element.

Each of the tilting elements T1-T11 have side guides sides SGL, SGR. These side guides SGL, SGR are implemented as sets of two free rolling wheels that will contact a side of the tote and thus guide the tote sidewards with a minimal friction. During tilting for emptying, one of the side guides SGR will support the side of the tote while rolling thereon, and thus prevent the tote from falling off the tilting elements T1-T11 while tilted for emptying. Hereby, the tote can continue its forward motion while being in the most tilted position for emptying. This serves to provide a high speed and thus a high capacity of the sorting mechanism.

Together, the friction belts FB and the side guides SGL, SGR serve to form a track for forward moving transport of the totes, and due to the individually tiltable tilting elements T1-T11, it is possible to control the individual tilting angles of the individual tilting elements T1-T11, such as a function of time and coordinated with the position of passing tote, and possibly also moving speed of the tote, so that the tote can be gradually tilted up to a tilting angle where its load is emptied, i.e. discharged. Still, this is possible while the tote moves forward in the transport direction at high speed, e.g. 0.5 m/s, 1 m/s, 1.5 m/s, 2 m/s, or even higher. Thus, the tilting elements T1-T11 are preferably controlled so as to provide a forward propagating wave supporting the tote in a combined forward and tilting movement. This wave form is preferably matched to the length of the actual tote to be handled, and further also to the actual speed of the tote passing. Hereby, a high capacity can be provided.

The tilting of the tilting elements T1-T11 in FIG. 1 illustrates one possible individual pattern of tilting angles for the various tilting elements T1-T11 at one moment in time. As seen, a group of tilting elements T4-T8 have one common tilting angle, and this group of tilting elements T4-T8 are tilted most, thus corresponding to a tilting angle where a tote positioned thereon will be emptied. With the group of tilting elements T4-T8 and with the same tilting angle supporting the tote during emptying, it is ensured that the tote solely performs a transverse tilt without any forward or backward tilting or without any bouncing during the emptying process, which may cause a poor emptying or even cause the tote to crash, or at least create unwanted noise.

Figure 2:
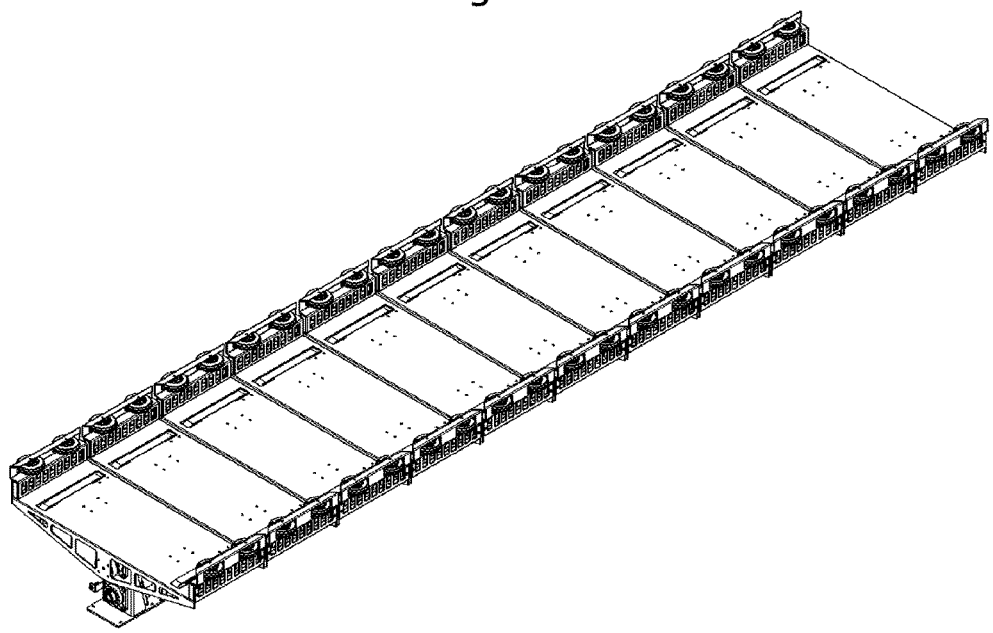
FIG. 2 illustrates the embodiment of FIG. 1 but with all tilting elements in a horizontal or neutral position.

FIG. 2 shows the same embodiment of FIG. 1, but with all 11 tilting elements in a neutral tilting position, namely with all tilting elements in a horizontal position. In this configuration, the sorting mechanism is prepared to receive a tote for merely passing without tilting and thus without emptying the tote.

Figure 3A:
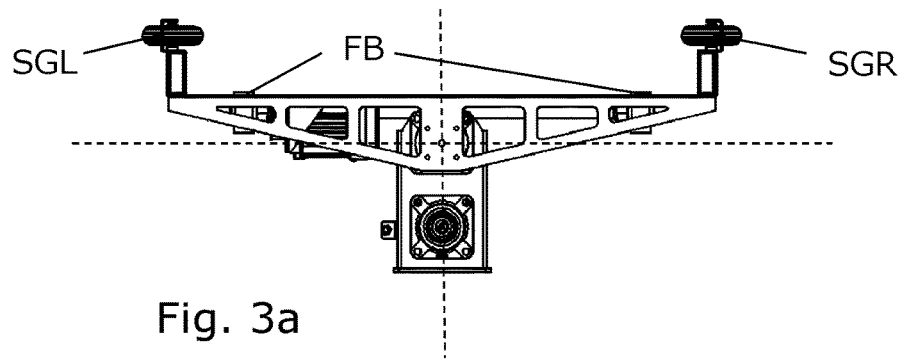
FIGS. 3a-3c illustrate one tilting element seen from its end at three different tilting angles: one horizontal (neutral) position, one tilted to one side, and one tilted to the opposite side.
Figure 3B:
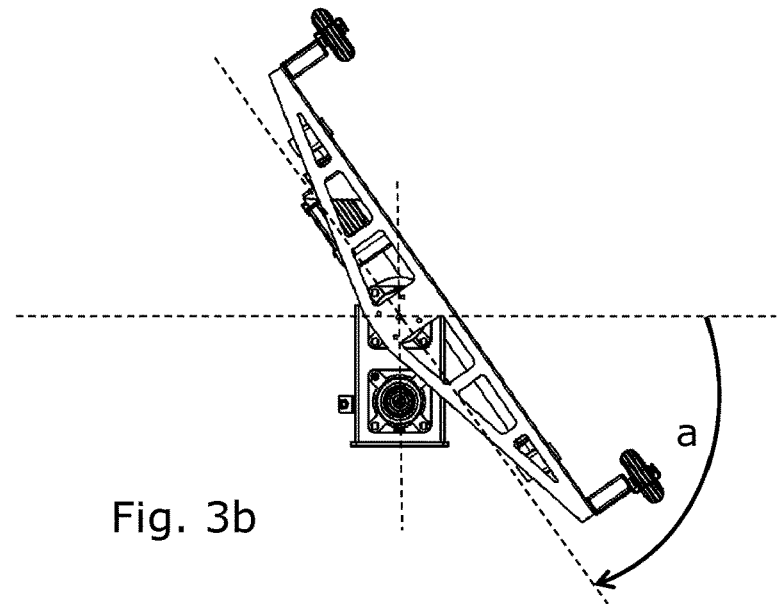
Figure 3C:
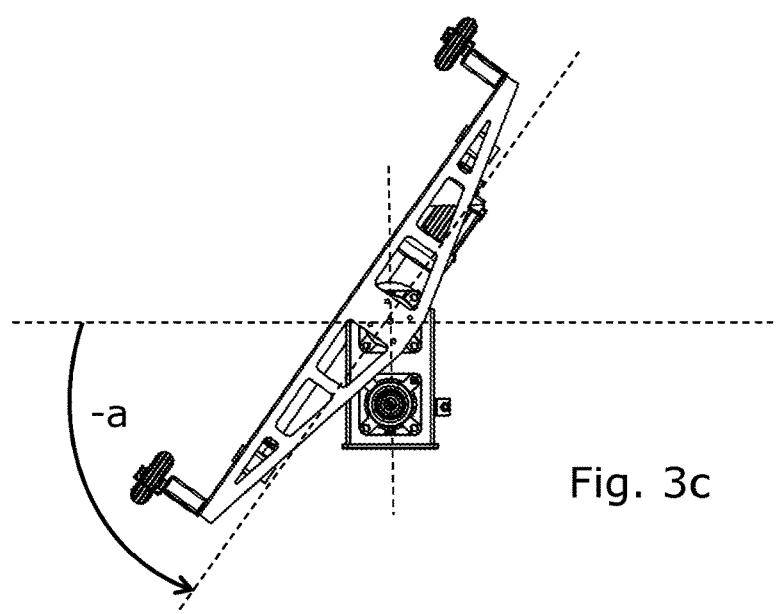

FIGS. 3a-3c show a tilting element at different tilting angles, seen from its end, i.e. in the transport direction. The tilting element is the same as seen in the embodiment of FIGS. 1 and 2. The intersection between the two perpendicular dashed lines indicate the position of the axis of tilting, namely an axis parallel with the transport direction.

In FIG. 3a, the tilting element is in a neutral or horizontal position, where the tilting in relation to horizontal is 0°. The protruding friction belts FB in each side of the tilting element is only slightly visible, since they only protrude slightly from the generally planar upward facing surface. The side guides in each side SGL, SGR in the form of wheels are also seen. Thus, a tote positioned on the tilting element will be supported in a vertical direction by the friction belts FB, and horizontally it will be guided by the wheels of the side guides SGL, SGR.

In FIG. 3b, the tilting element has a tilting angle of 'a' relative to horizontal, and to the right, whereas the tilting element in FIG. 3c is shown to have the same tilting angle relative to horizontal, but to the left, thus denoted '-a'.

Figure 4:
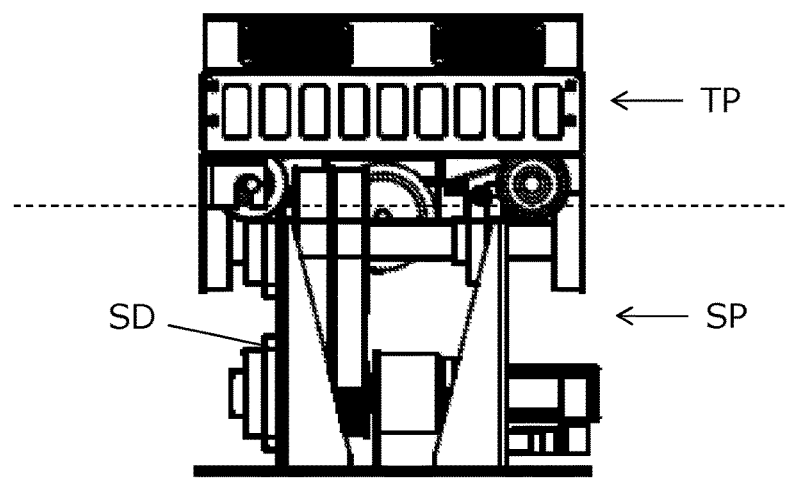
FIG. 4 illustrates one tilting element seen form one side.

FIG. 4 shows a tilting element seen from its side. The dashed line indicates the tilting axis which is parallel with the transport direction. The tilting element is part of a tilting part TP, which is tiltably mounted on a stationary part SP such that the tilting element can be tilted around the tilting axis actuated by a servo drive SD comprising a servo motor that forces the tilting part TP to tilt relative to the stationary part SP via a belt, a chain, a gear box or one or more meshed wheels or the like. The servo drive SD is arranged to provide the desired tilting angle in response to an electric input signal from the computerized controller (not shown). The stationary part SP stands on the floor or ground or is fixed thereto. However, since the tilting part TP can only be moved relative to the stationary part SP by tilting around the tilting axis, the tilting part is stationary in the transport direction.

Figure 5:
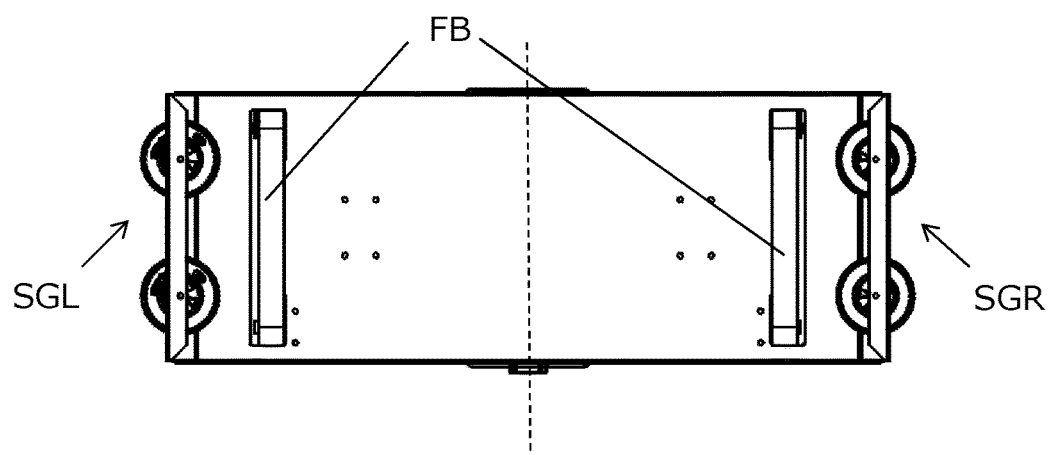
FIG. 5 illustrates one tilting element seen from above.

FIG. 5 illustrates a top view of a tilting element, still from the same embodiment as in the preceding figures. The dashed line indicates a centre axis which is also the tilting axis, and as seen, the tilting element is symmetric around this axis. The friction belts FB, one in each side symmetrically positioned, are visible, as well as the side guide sets of wheels SGL, SGR with two wheels on each side. It is seen that the proportions of the tilting element is such that its overall width is about 3 times its length seen in the transport direction. Since the container or tote is actually supported by the friction belts FB and the side guides SGL, SGR, it is understood that the plane upper surface merely serves the purpose of protecting the mechanical and electrical components mounted below, and further to allow easy cleaning. However, with regard to its basic function, a more open structure could be used.

Figure 6A:
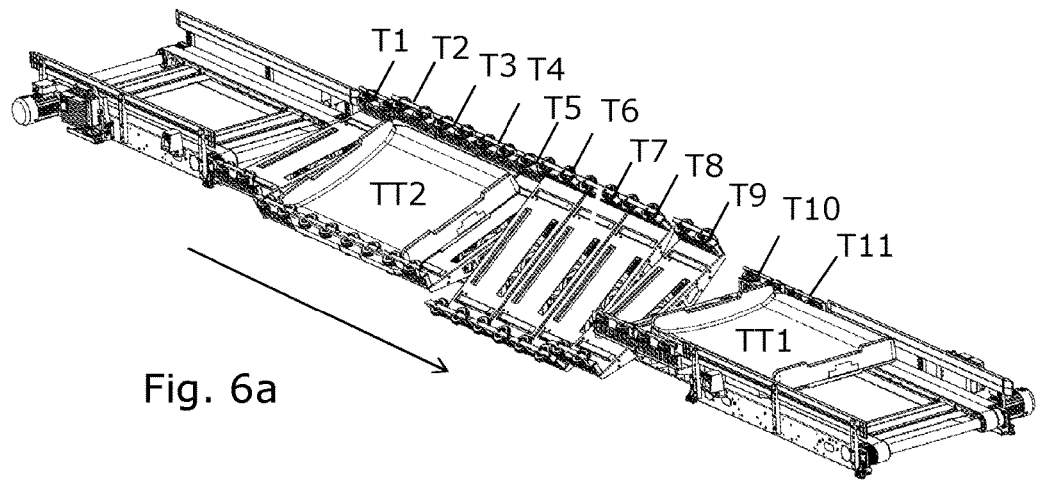
FIG. 6a-6c illustrate an embodiment with 11 tilting elements in function at three different positions of a tote relative to tilting elements: one entering the sorting mechanism, one during tilting (discharge), and one leaving the sorting mechanism.
Figure 6B:
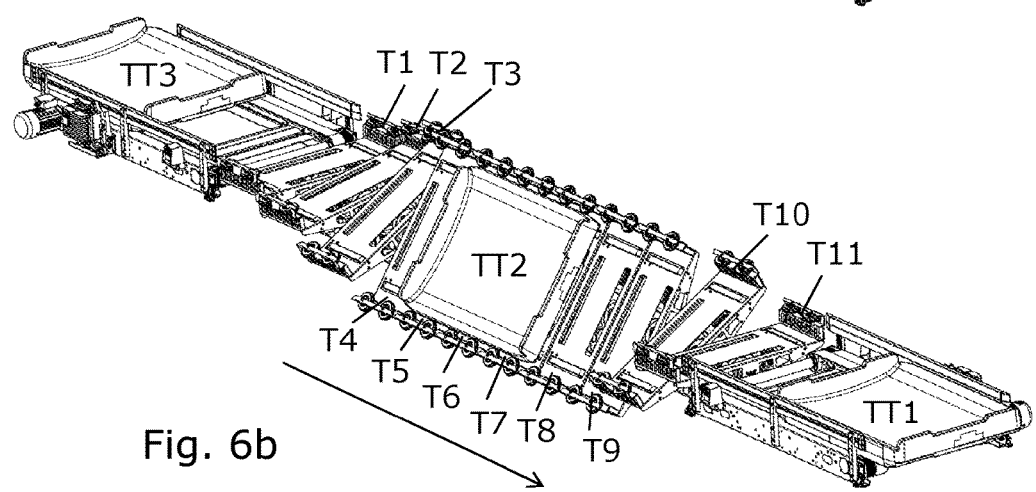
Figure 6C:
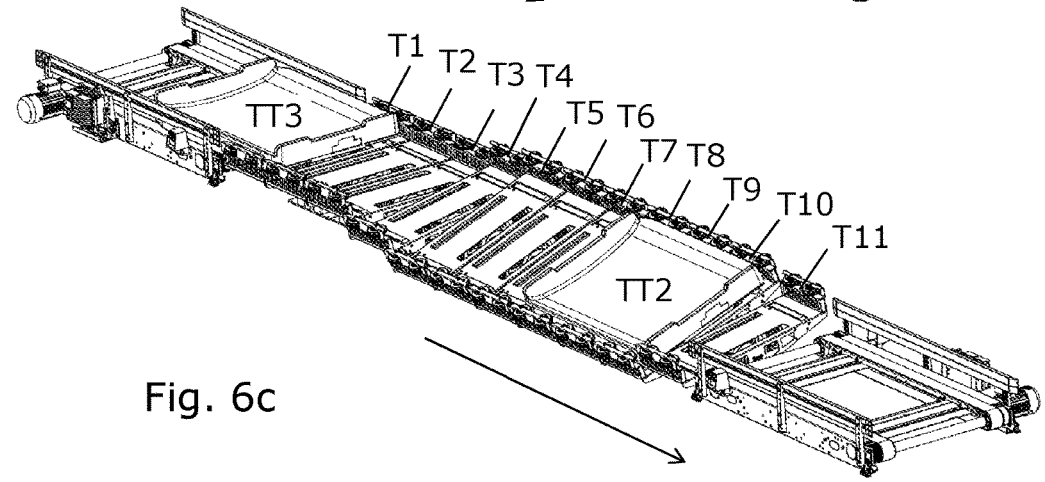

FIGS. 6a-6c illustrate drawings at different moments in time of the sorting mechanism embodiment with 11 tilting elements T1-T11 from FIGS. 1-5 in function during passage of a tote TT2 (without any load) which is gradually tilted up to a tilting angle which would normally ensure emptying of its load. Arrows indicate the transport direction. A conveyor track serves to transport totes to the entry of the sorting mechanism at a horizontal position, i.e. the totes TT1, TT2, TT3 arrive at the first tilting element T1. Another conveyor track serves to transport totes TT1, TT2, TT3 away from the sorting mechanism in horizontal position, i.e. this conveyor track receives totes TT1, TT2, TT3 from the last tilting element T11. In the illustrations, totes TT1, TT2, TT3 each have a length which is about three times the length of each of the tilting elements, seen in the transport direction.

FIG. 6a shows the situation where a tote TT2 has arrived at a group of tilting elements T2-T5 which have all been controlled to have the same tilting angle, and the tote TT2 is thus supported by these four tilting elements T2-T5 and is thereby tilted with the same tilting angle as the supporting group of tilting elements T2-T5. Thus, at this point in time, the tote TT2 is slightly tilted, such as about 10°. At the end of the sorting mechanism, a preceding tote TT1 is about to leave the sorting mechanism, since only its rear end is supported by the last tilting element T11 in the row. As seen, this last tilting element T11, as well as its neighbouring tilting element T10, are still in horizontal position, i.e. at zero tilting angle, since these tilting elements T10, T11 participate in supporting the rear end of the tote TT1 to a horizontal position for smooth transition to the following horizontal conveyor track where the front end of the tote TT1 is supported.

FIG. 6b shows the tote TT2 a short moment later where the tote TT2 has been tilted to a tilting angle for emptying or discharging, such as 40-60°, depending on the shape of tote TT2. The tote TT2 has now arrived at the middle part of the sorting mechanism where a group of 6 neighbouring tilting elements T4-T9 are tilted to one common tilting angle, namely a tilting angle sufficient to empty the tote TT2 (when a load is present). It is noted that the tote TT2 is supported by only four tilting elements T4-T7 of the group T4-T9. Thus, tilting elements T8 and T9 have already been controlled to obtain a tilting angle so as to smoothly receive the tote TT2 when it arrives. Tilting element T10 is in an intermediate tilting angle preparing to receive the tote TT2 when it has been partly tilted back towards horizontal position. The last tilting element T11 is still in horizontal position, since the preceding tote TT1 has just left the last tilting element T11.

Even though actually only three or four tilting elements support the tote TT2 at a time, a group of 6 or 7 are required to cooperate in tilting the tote TT2 so as to provide a smooth gradual tilting movement without the tote TT2 tilting forwards or backwards. It is to be understood that the group will move forward as a function of time in steps of one tilting element, so as to effectively create a propagating wave supporting the tote TT2. One, two or three tilting elements in front of the tote TT2 have already entered a tilting angle so as to smoothly support the tote TT2 when arriving. However, to provide a high speed, it is preferred that a tilting element returns to an initial tilting angle, as soon as it is detected that the tote TT2 has left the tilting element. Therefore, as slightly visible, the tilting element T3 immediately behind the tote TT2, has just started tilting towards an initial or next tilting angle. Hereby, the tilting element T3 can prepare to receive the next arriving tote TT3. The required number of tilting elements T8-T9 in front of the tote TT2 having entered the same tilting angle as the group of tilting elements T4-T7 supporting the tote TT2 depends on the speed of the tote TT2 and on the relative lengths of the tilting elements T1-T11 and tote TT2. Tilting element T1 has returned to horizontal position, preparing to receive the next tote TT3.

FIG. 6c illustrates that the tote TT2 has now arrived at the last part of the sorting mechanism, and it is now supported by tilting elements T8-T10, and the group of neighbouring tilting elements having the same tilting angle has now moved forward to tilting elements T5-T10, and their common tilting angle have cooperated to tilt the tote TT2 back to a tilting angle of such as 10-15°. The last tilting element T11 has now obtained an initial tilting angle of such as 7°, thus preparing to support the tote and tilt it back to horizontal position. In the opposite end of the sorting mechanism, the next tote TT3 has arrived at the first tilting element T1 which is still in horizontal position, i.e. 0° tilting angle. Tilting elements T2 and T3 are also at horizontal position, while tilting element T4 has obtained an intermediate tilting angle, such as 7°, thus preparing to smoothly receive the tote TT3 at a slightly tilted angle. At the moment illustrated by FIG. 6c, two totes TT2, TT3 are present on the tilting elements T1-T11 of the sorting mechanism, and it is seen that it is possible to handle totes TT2, TT3 arriving spatially close to each other, thus providing a high capacity. Especially, it is preferred that the conveyor track or other feeding mechanism bringing totes to the sorting mechanism is arranged to deliver the totes at regular intervals and spatially equally spaced apart, so as to provide the highest possible capacity of the sorting mechanism.

Figure 7:
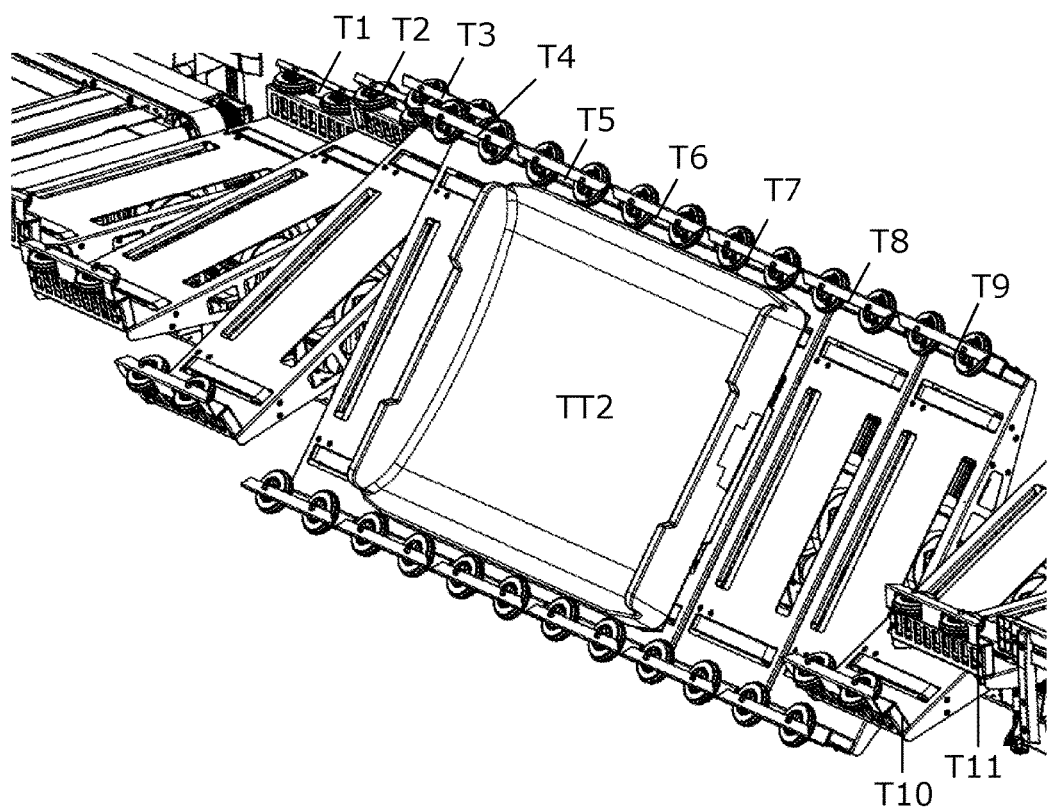
FIG. 7 illustrates a zoomed version of FIG. 6b where a tote is tilted for emptying.

FIG. 7 is a zoomed version of FIG. 6b, i.e. where the tote TT2 is in the middle of the sorting mechanism in a tilted position for emptying or discharging its load (not shown). The tote TT2 is supported by the three tilting elements T5-T7 which have one common tilting angle. The tote TT1 has just left tilting element T4 which still has the same tilting angle as the supporting group T5-T7, but as seen, the preceding tilting element T3 is tilting back to an initial tilting angle so as to quickly prepare for participating in supporting the following tote. The tote TT2 is supported sidewards by the sideguiding wheels on the supporting tilting elements T5-T7. As seen, the width of the tilting elements T1-T11 is selected to match the width of the tote TT2 rather precisely, since it is seen that the sideguiding wheels on both sides of the tote TT2 touch or almost touch the sides of the tote TT2. Hereby, a smooth transport of the tote TT2 without any sideward bouncing can be provided.

Figure 8:
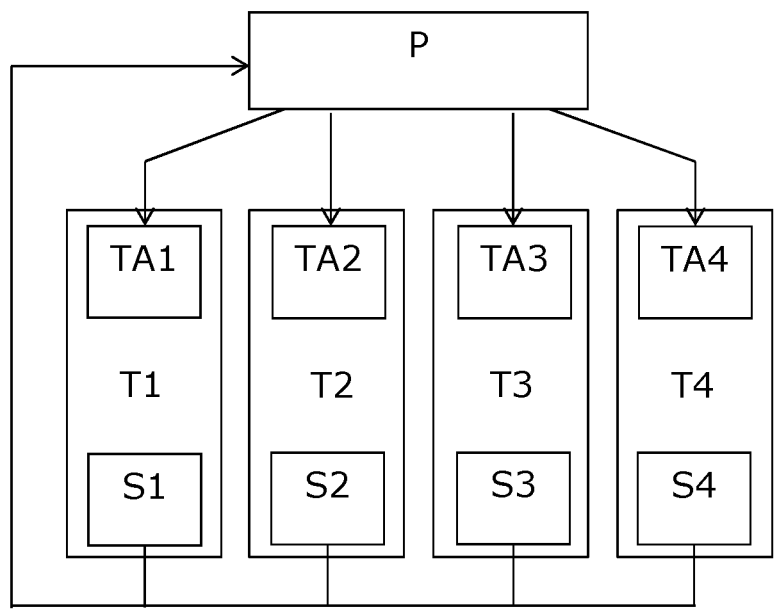
FIG. 8 illustrates a block diagram sketching basic elements in the control of the tilting elements with feedback from position sensors placed on or near each tilting element.

FIG. 8 illustrates a block diagram showing an example of control of four tilting elements T1-T4. Each of the tilting elements T1-T4 includes respective individually controllable tilting actuators TA1-TA4, which are controlled by a computerized controller in the form of a processor system P. The processor system P runs a control algorithm which calculates and generates electric control signals to each of the individual tilting actuators TA1-TA4 according to a predetermined tilting strategy and in response to position signals in the form of outputs from position sensors S1-S4 arranged on or near each of the tilting elements T1-T4 to sense the presence of a tote on or near the tilting element T1-T4, e.g. the position sensors S1-S4 may be based on optical sensors. In a practical implementation, each of the tilting actuators TA1-TA4 may have an individual controller, such as especially in case of the actuator being a servo motor, each servo motor may have a servo controller. These servo controllers may then be connected to a field bus which is controlled by the control algorithm serving to control the tilting angle strategy, and thus the control algorithm is preferably implemented in software.

Taking into account various response delays in tilting actuators TA1-TA4 and with knowledge of actual position of the position sensors S1-S4, e.g. a calculated or known speed of the tote etc., the processor system P generates individual outputs to the tilting actuators TA1-TA4 so as to control the tilting pattern of the tilting elements T1-T4 versus time.

With inputs from the position sensors S1-S4, the position of the tote is known, i.e. both its front and end, seen in the transport direction. Thus, the control algorithm can adjust the individual tilting angles of the tilting elements T1-T4 accordingly. Hereby, it can be ensured that the tilting elements T1-T4 perform a tilting motion propagating in the transport direction, serving to support the tote while passing the sorting mechanism in the transport direction and at the same time performs a transverse tilting movement so as to empty the tote, and so as to empty a load in the transverse direction.

It is understood that the function of the computerized controller, here illustrated as a processor system P can be implemented in various ways. Preferably, the computerized controller includes a digital processor running a control algorithm which is implemented in software, so as to allow easy updating and adaptation of the function of the sorting mechanism. In some embodiments, the processor system P is implemented by means of a Programmable Logic Controller (PLC).

The electric control signals generated by the processor system P, so as to individually control tilting of each of the tilting elements, can have various forms depending on the type of tilting actuator used and depending on the angular resolution of tilting angle which can be in the form of a digital or analog electric signal. Preferably, the angular resolution of the tilting angle can be controlled with an angular resolution of at least 5°, such as 2° or even smaller, and preferably the tilting angle can be controlled at least within an interval of 0° to 45°, such as 0° to 60°. A high angular resolution of the electric control signal and tilting actuator will provide the possibility of precisely following a desired wave motion pattern for the container when passing the tilting elements. The resulting wave motion pattern to which the container can be exposed also depends on the spatial resolution of the tilting elements, i.e. the length of each tilting element seen in the transport direction, and especially it depends on the length of each tilting element seen in the transport direction compared to and as well as the length of the container to be handled. It is preferred that the length of each tilting element seen in the transport direction is smaller than 50% of the length of the container to be handled, and more preferably smaller than 40% of the length of the container to be handled, but even shorter tilting elements compared to the container length may be preferred.

It is to be understood that the temporal response of the actuator should be sufficient to obtain the desired tilting speed required to obtain a desired capacity in terms of the number of container or totes to be handled by the sorting mechanism. A capacity of more than 3000 containers or totes can be handled and emptied by the embodiment shown in FIGS. 1-7, where the 11 tilting elements are actuated by respective servo motors. This corresponds to an average speed in the transport direction of 2.3 m/s. This capacity is sufficient e.g. for sorting of luggage in a tote-based luggage handling system in many airports.

It is preferred that the sorting mechanism can receive a container at one speed in the transport direction and then maintain this speed during passage of the sorting mechanism without slowing down, and especially it is preferred that the speed in the transport direction is also maintained in case the passing container is to be tilted for emptying.

Especially, in embodiments arranged to tilt a container for emptying in two opposite directions transverse to the transport direction, the controllable tilting angle interval may be such as 60° to +60°, where 0° corresponds to a horizontal, i.e. neutral, position.

It may be preferred that the tilting elements of the sorting mechanism are arranged on a row to constitute a straight line. However, it is to be understood that the tilting elements may alternatively be arranged so as to provide a horizontal curve, and thus provide a curved transport direction for the containers or totes while passing the sorting mechanism. In such case, a "neutral" tilting angle for the tilting elements may not be horizontal or 0° tilting angle, however due to the speed of the containers passing the curve, a tilting angle different from horizontal may be selected, especially it may be preferred to adjust the neutral tilting angle in response to the speed of the containers, so as to avoid accidental unloading of the containers in the curve. Arranging the tilting elements of the sorting mechanism in a horizontal curve can be advantageous for application of the sorting mechanism where it is preferred to perform discharging in a horizontal curve. E.g. this may be advantageous where limited space is available for discharging, or where discharging for some reason is preferred to take place at a specific location, e.g. near a corner of a hall.

Various details in the tilting strategy can be implemented in the control algorithm to improve the total capacity of the system, e.g. controlling a tilting element so as to immediate return it to a predetermined tilting angle, e.g. 7°, after it is sensed that the tilted tote has left the actual tilting element. Hereby, the tilting element is prepared to receive the next container or tote in line. Thus, with knowledge of actual position of the tote, the most effective tilting strategy can be obtained. To further increase the capacity of the sorting mechanism by precise knowledge of position of the tote, two position sensors for each tilting elements may be used.

Figure 9:
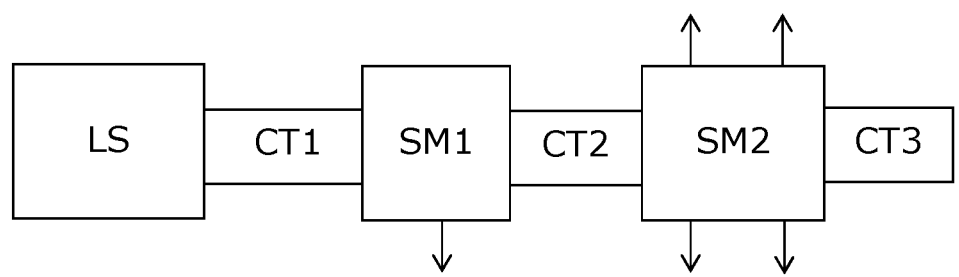
FIG. 9 illustrates a block diagram of a sorter system embodiment.

FIG. 9 illustrates a sketch of a sorting system embodiment for sorting luggage. At a load station LS, pieces of luggage are loaded onto totes. A conveyor track CT1 transports the totes to a first end of a first sorting mechanism SM1. At this sorting mechanism SM1, the totes can either pass to a second end without being tilted, or they can be tilted for emptying its load in the direction indicated by the arrow. A further conveyor track CT2 transports totes received from the second end of the first sorting mechanism SM1 to a first end of a second sorting mechanism SM2.

This second sorting mechanism SM2 can also let the totes pass without tilting to its second end, or it can tilt the totes for emptying in one of the four directions indicated by arrows, before it arrives at the second end of the sorting mechanism SM2. Especially, the opposite emptying directions transverse to the transport direction can be implemented by some of or all of the tilting elements in the second sorting mechanism SM2 being tiltable in both transverse directions. Finally, a conveyor track CT3 transport totes away from the second end of the second sorting mechanism SM2. It is to be understood that such sorting system can include several more sorting mechanisms spatially distributed, so as to allow transport of luggage to and from several locations in an airport. Especially, it may be preferred that all sorting mechanisms in the system are based on one single type of tilting element even though they have different lengths and are used for emptying at only one or at several different locations. This will allows easy and fast repair in case of breakdown of one tilting element, since only one type of spare tilting element needs to be stocked to allow repair of all sorting mechanisms by replacement of the broken tilting element.

To sum up: the invention provides a sorting mechanism arranged to empty or discharge a container for carrying a load, e.g. a tote in a luggage handling system. The sorting mechanism as a plurality of tilting elements T1-T11 for receiving and transporting the container in a transport direction. The tilting elements T1-T11 are arranged neighbouring each other, and they are individually tiltable by controllable tilting actuators. Hereby, the tilting elements T1-T11 can tilt around an axis parallel with the transport direction.

A computerized controller serves to individually control the tilting of the tilting elements T1-T11 with a control algorithm in response to at least one position signal such that a group of at least two neighbouring tilting elements T1-T11 perform a coordinated tilting motion in response to the position signal so as to tilt the container for emptying or discharging its load, upon the container passing the sorting mechanism in the transport direction.

A row of such as 10-20 identical tilting elements T1-T11 each with a length of such as 30-50% of the shortest container or tote to be handled. The tilting elements T1-T11 are preferably stationary seen in the transport direction, and the container or tote is driven forward by friction drive means FB on each of the tilting elements T1-T11. Preferably, position sensors on or at each tilting element T1-T11 serve to provide input to the controller regarding position of the container or tote, thus enabling the control algorithm to generate control signals to control a tilting angle of each of the tilting elements T1-T11 accordingly to provide a forward propagating wave serving to smoothly support the container in a gradual combined tilting and forward motion.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A sorting mechanism arranged to empty a container for carrying a load, the sorting mechanism comprising:
    a plurality of tilting elements arranged to receive and transport the container in a transport direction, said plurality of tilting elements comprise friction drive elements arranged to drive the container in the transport direction, the plurality of tilting elements being arranged neighbouring each other,
        individually tiltable by individually controllable tilting actuators, which are arranged to tilt the tilting elements around a tilting axis parallel or substantially parallel with the transport direction, the tilting elements being symmetric around said tilting axis, and
    a computerized controller arranged to control the individually controllable tilting actuators in accordance with a control algorithm in response to at least one position signal, wherein the control algorithm is arranged to control the tilting actuators of a group of at least two tilting elements so as to cause the group of at least two tilting elements to perform a coordinated tilting motion in response to the at least one position signal so as to tilt the container for emptying its load, upon the container passing the sorting mechanism in the transport direction, and wherein
    each of the tilting elements is operable by respective individually controllable tilting actuators to tilt the respective tilting element, the tilting actuators are arranged to tilt the tilting elements to both sides of a neutral position, so as to allow tilting of the container in two opposite directions transversely to the transport direction, and wherein
    the control algorithm is arranged to increase a tilting angle of the group of at least two tilting elements during the container passing the at least two tilting elements.

2. The sorting mechanism according to claim 1, wherein the control algorithm is arranged to control tilting angles of each of the tilting elements of the group of at least two tilting elements such that they perform identical or substantially identical tilting motions simultaneously.

3. The sorting mechanism according to claim 2, wherein the control algorithm is arranged to control the group of at least two tilting elements such that they simultaneously have one common tilting angle, and wherein the common tilting angle is gradually increased over time.

4. The sorting mechanism according to claim 3, wherein the common tilting angle is gradually increased to a tilting angle serving to empty the container.

5. The sorting mechanism according to claim 4, wherein a tilting angle of a tilting element is decreased upon the container leaving the tilting element.

6. The sorting mechanism according to claim 5, wherein a tilting angle of at least one tilting element is decreased to a pre-determined non-horizontal tilting angle so as to prepare for receipt of a successive container.

7. The sorting mechanism according to claim 1, wherein the group of at least two tilting elements comprises at least three tilting elements.

8. The sorting mechanism according to claim 1, wherein the control algorithm is arranged to adjust a number of tilting elements included in the group of at least two tilting elements in response to a size of the container to be handled.

9. The sorting mechanism according to claim 8, wherein the control algorithm is arranged to adjust a number of tilting elements included in the group of at least two tilting elements in response to a speed of the container to be handled.

10. The sorting mechanism according to claim 1, wherein the control algorithm is arranged to control tilting angles of the plurality of tilting elements so as to change tilting angle of one, two or three tilting elements at a time in a wave of tilting neighbouring tilting elements in the transport direction.

11. The sorting mechanism according to claim 1, wherein the control algorithm is arranged to control individual tilting angles of the tilting actuators of the plurality of tilting elements, such that the tilting elements cooperate to support the container during its passage of the plurality of tilting elements.

12. The sorting mechanism according to claim 1, wherein the individually controllable actuators of the plurality of tilting elements are each arranged for being controlled to at least three different tilting angles.

13. The sorting mechanism according to claim 1, wherein the at least one position signal is generated in response to a position sensor arranged to sense a position of the container.

14. The sorting mechanism according to claim 13, wherein the position sensor is arranged on or near at least one tilting element to sense a position of the container relative to the at least one tilting element.

15. The sorting mechanism according to claim 14, wherein a plurality of position sensors are placed on or near respective tilting elements to sense a position of the container relative to the respective tilting elements, and wherein a plurality of respective position signals are generated in response to said plurality of position sensors.

16. The sorting mechanism according to claim 13, wherein at least two position sensors are placed on or near at least one tilting element at different locations relative to the at least one tilting element, so as to sense a container arrival to the at least one tilting element and container departure from the at least one tilting element, respectively.

17. The sorting mechanism according to claim 1, wherein the position signal is indicative of a position of the container relative to at least one of the plurality of tilting elements.

18. The sorting mechanism according to claim 1, wherein the tilting actuators are arranged to provide a plurality of tilting angles correlated to an electric input signal, and wherein the tilting actuators comprise one of: a stepping motor, a servo motor, or a pneumatically driven actuator.

19. The sorting mechanism according to claim 1, wherein the control algorithm is arranged to tilt a first container to empty its load to one direction transversely to the transport direction and to tilt a successive second container to empty its load to the opposite direction transversely to the transport direction.

20. The sorting mechanism according to claim 1, wherein a length of at least one of the tilting elements, seen in the transport direction, is smaller than a length of the container.

21. The sorting mechanism according to claim 20, wherein a length of at least two of the tilting elements, seen in the transport direction, is smaller than a length of the container.

22. The sorting mechanism according to claim 1, wherein the friction drive elements are driven by individual driving means for each of the plurality of tilting elements.

23. The sorting mechanism according to claim 1, wherein the plurality of tilting elements have guides at least on one side, seen in the transport direction, so as to support the container sidewise.

24. The sorting mechanism according to claim 1, wherein the control algorithm is arranged to control the plurality of tilting elements so as to handle simultaneous passage of at least two containers at different positions along the plurality of tilting elements.

25. The sorting mechanism according to claim 1, comprising at least four tilting elements.

26. The sorting mechanism according to claim 1, wherein the group of at least two tilting elements is a group of at least two neighbouring tilting elements.

27. A sorting system for sorting a load carried on containers, the sorting system comprising:
at least one sorting mechanism according to claim 1, and
at least one conveyor track arranged to transport the container to the at least one sorting mechanism.

28. A method for emptying a container carrying a load in a sorting mechanism, the method comprising:
receiving the container at a plurality of individually tiltable tilting elements neighbouring each other and being arranged to transport the container in a transport direction, said plurality of tilting elements comprise friction drive elements arranged to drive the container in the transport direction, wherein the tilting elements are tiltable around a tilting axis parallel or substantially parallel with the transport direction, the tilting elements being symmetric around said tilting axis,
controlling, by means of a computerized control algorithm, tilting of a group of at least two tilting elements to perform a coordinated tilting motion in response to the at least one position signal so as to tilt the container for emptying its load, upon the container passing the sorting mechanism in the transport direction, the tilting actuators are arranged to tilt the tilting elements to both sides of a neutral position, so as to allow tilting of the container in two opposite directions transversely to the transport direction, and
increasing a tilting angle of the group of at least two tilting elements during the container passing the at least two tilting elements.

29. The method according to claim 28, comprising controlling tilting angles of each of the tilting elements of the group of at least two tilting elements such that they perform identical or substantially identical tilting movements simultaneously.

30. The method according to claim 29, comprising controlling the group of at least two tilting elements such that they simultaneously have one common tilting angle, and gradually increasing the common tilting angle over time.

31. The method according to claim 30, comprising gradually increasing the common tilting angle to a tilting angle serving to empty the container.

32. The method according to claim 31, comprising decreasing a tilting angle of a tilting element upon the container leaving the tilting element.

33. The method according to claim 32, comprising decreasing a tilting angle of at least one tilting element to a pre-determined non-horizontal tilting angle so as to prepare for receipt of a successive container.

34. The method according to claim 28, comprising controlling the plurality of individually tiltable tilting elements to at least three different tilting angles.

35. The method according to claim 28, comprising sensing a position of the container, and generating the at least one position signal in response thereto.

36. The method according to claim 28, comprising controlling a flow of containers arriving to the sorting mechanism in order to ensure that the containers arrive to the sorting mechanism at regular or substantially regular intervals.

37. The method according to claim 28, wherein the group of at least two tilting elements is a group of at least two neighbouring tilting elements.

* * * * *